US005271270A

United States Patent [19]

Knauer et al.

[11] Patent Number: 5,271,270

[45] Date of Patent: Dec. 21, 1993

[54] FUEL INJECTION NOZZLE FOR INTERNAL COMBUSTION ENGINES

[75] Inventors: Alfred Knauer; Ulli Lessing, both of Stuttgart; Karl Hofmann, Neckarrems; Kurt Seifert, Esslingen Zollberg, all of Fed. Rep. of Germany

[73] Assignee: Robert Bosch GmbH, Stuttgart, Fed. Rep. of Germany

[21] Appl. No.: 839,162

[22] Filed: Feb. 21, 1992

[30] Foreign Application Priority Data

Mar. 15, 1991 [DE] Fed. Rep. of Germany ....... 4108416

[51] Int. Cl.$^5$ ............................................ G01M 15/00

[52] U.S. Cl. .................................................. 73/119 A

[58] Field of Search ............. 73/119 A; 439/456, 459, 439/465

[56] References Cited

U.S. PATENT DOCUMENTS

| | | | |
|---|---|---|---|
| 3,858,160 | 12/1974 | Denton | 439/456 |
| 4,502,326 | 3/1985 | Kaczyuski | 73/119 A |
| 5,151,050 | 9/1992 | Scholz et al. | 439/456 |

FOREIGN PATENT DOCUMENTS

| | | | |
|---|---|---|---|
| 0099991 | 2/1984 | European Pat. Off. . | |
| 3937750 | 5/1991 | Fed. Rep. of Germany . | |
| 2068176 | 8/1981 | United Kingdom | 439/459 |

*Primary Examiner*—Robert Raevis

*Attorney, Agent, or Firm*—Edwin E. Greigg; Ronald E. Greigg

[57] ABSTRACT

An injection nozzle for internal combustion engines has an electrical needle motion sensor, having a cable leading to an evaluation device. To dispose the terminals of the contact lugs of the needle motion sensor and the contact ends of the individual wires of the cable in such a way that they are shake-proof, relieved of tensile strain and protected against splashing water, they are encapsulated in a two-piece insulating shaped part, which is fixed in a recess of the holder body of the injection nozzle. The soldered terminals rest on support bases of pockets in the inner insulating shaped part, and the adjoining parts of the individual wires are bent back and guided in a U around retaining protrusions. The insulating shaped parts and the sheathed cable are fixed by a cover strip or by pins. The preferred field of application is injection nozzles for Diesel engines.

20 Claims, 3 Drawing Sheets

FUEL INJECTION NOZZLE FOR INTERNAL COMBUSTION ENGINES

BACKGROUND OF THE INVENTION

The invention is based on a fuel injection nozzle for internal combustion engines. In a known injection nozzle of this type (European Patent Application 0 099 991), the contact ends of lines that lead to an evaluation device are electrically connected in a lateral recess of the injection nozzle holder to contact lugs of an inductive needle motion sensor. The recess is closed with a plugshaped insulating body, through which a sheathed cable containing the lines is passed. The insulating body also has an opening through which a wedging tool can be passed in order to fix an adjusting part of the needle motion sensor.

An injection nozzle with a needle motion sensor is also known (German Patent Application P 39 37 750.4; not published prior to the filing date of the present application), in which the electrical terminal connection of the needle motion sensor is received in a two-part insulating body, and the sheath of the cable having the onwardly extending lines is pressed against the insulating body parts by two slight protrusions, in order to relieve the tensile strain on the soldered connections. An electrical terminal of the needle motion sensor of an injection nozzle in which the soldered connections and assembly of the insulating body parts can be accomplished by machine is needed.

OBJECT AND SUMMARY OF THE INVENTION

The injection nozzle with a needle motion sensor has an advantage that the contact lugs for soldering to the contact ends of the onwardly extending lines attain a flush contact with the inner insulating shaped part, and this connection is reliably relieved from tensile strain by bending back the part of the onwardly extending lines bordering on the contact ends and by means of an additional U-shaped deflection between staggered retaining protrusions on the insulating shaped parts. In addition, the assembly of the parts and soldering of the terminals can be performed by machine.

Other advantageous features of the injection nozzle are attainable with the provisions set forth hereinafter. An especially advantageous feature is the disposition of pockets in the inner insulating shaped part for the contact lugs and contact ends as defined herein, so that these elements can be positioned accurately for soldering, and the connections are insulated from one another. Moreover, the soldered connections of the contact lugs are relieved from the effects of tension and shaking. A particularly advantageous and simple fixation of the insulating shaped parts and sheathed cable is obtained as set forth hereinafter.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
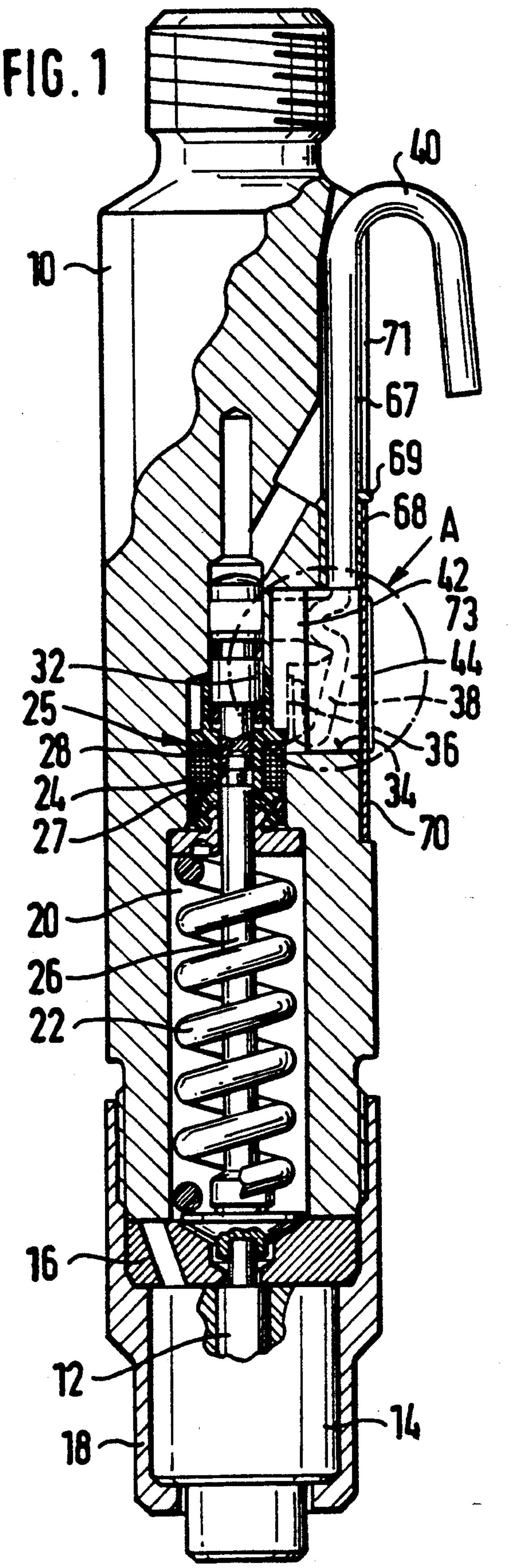
FIG. 1 shows a first exemplary embodiment of an injection nozzle for Diesel engines, in longitudinal section.
Figure 2:
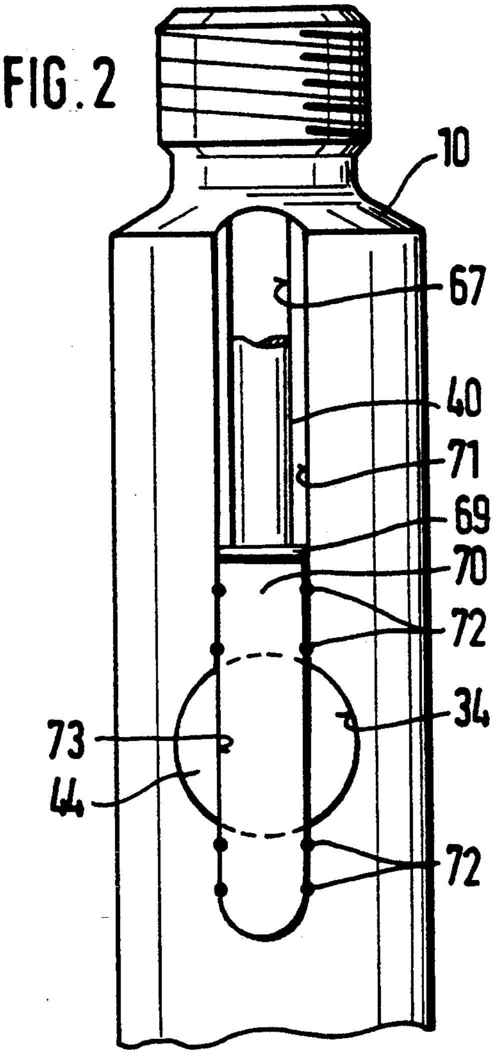
FIG. 2 shows the upper part of the injection nozzle of FIG. 1, in a side view.

The injection nozzle has a holder body 10, to which a nozzle body 14, which displaceably supports a valve needle 12, is secured by a union nut 18, together with a shim 16. The holder body 10 has a chamber 20 for receiving a closing spring 22, and it also contains a needle motion sensor 25 having an induction coil 24, which is influenced by a bolt 26 moved with the valve needle 12 and which has an insulating sheath 19 which has a portion 21 that extends upwardly into a space 32 and cylindrical recess 34 in the holder body. The needle motion sensor 25 functions on the basis of the air gap 27, which changes as a result of the valve needle motion, between the free end, acting as an armature, of the bolt 26 and a core 28 in the induction coil 24 and thus on the basis of the changes in inductivity of the induction coil. The fundamental structure and function of the injection nozzle with the needle motion sensor are those of a commercially available embodiment, so they need no further description in the present context.

Figure 3:
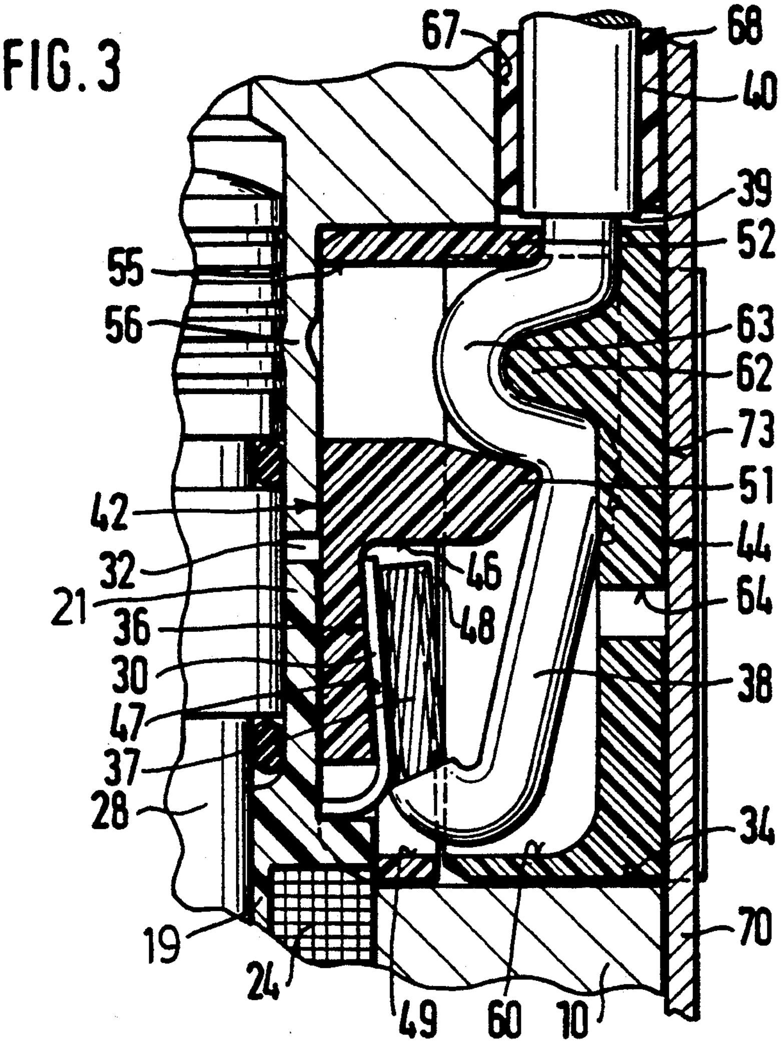
FIG. 3 shows an electrical terminal of the injection nozzle in the region A of FIG. 1, in section on a larger scale.
Figure 4:
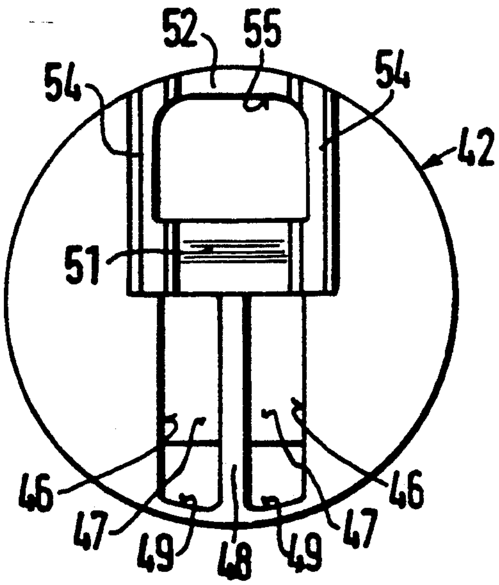
FIGS. 4 and 5 show two insulating shaped parts of the terminal of FIG. 3, in plan views of sides facing one another.
Figure 5:
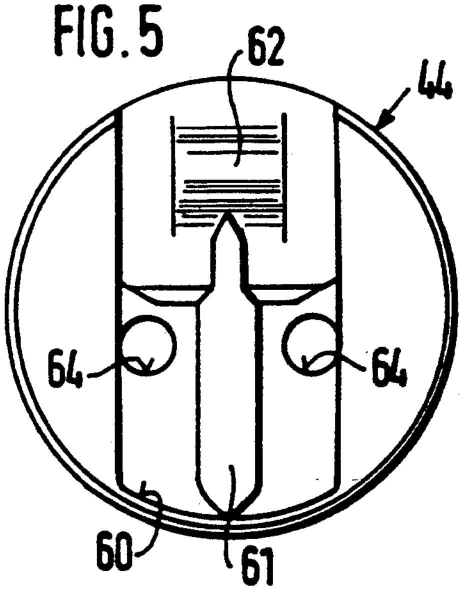

The induction coil 24 is connected electrically to two radially protruding soldering or contact lugs 30, which pass into the space 32 into a cylindrical recess 34 on the side of the jacket of the holder body 10 (FIG. 3). There, the contact lugs 30 are joined via soldered terminals 36 to the exposed, contact ends 37 of two onward-leading electrical lines, such as insulated leads or individual wires 38 of a sheathed cable 40 of oval cross section, having a sheath 39. For the sake of an insulated disposition of the soldered terminals 36 in the recess 34 of the holder body 10 in a shake-proof manner and protected against splashing water, an inner and outer insulating shaped part 42 and 44, respectively, made of an electrically insulating plastic is inserted into the recess 34. The inner insulating shaped part 42, which rests on the bottom of the recess 34, substantially comprises a circular plate adapted to the diameter of the recess 34. For receiving the contact lugs 30 of the induction coil 24 and the contact ends 37 of the individual wires 38, the inner insulating shaped part 42 has two pockets 46, extending radially parallel, approximately to the middle, with a support base 47 and a middle partition 48. Two peripheral openings 49 in the support base 47 join the pockets 46 to the transverse hole 42 of the nozzle holder 10, so that the contact lugs 30, protruding away from the induction coil 24, can be introduced through these openings 49 into the pockets 46 when the inner insulating shaped part 42 is inserted and can subsequently be bent over onto the support bases 47 of the pockets. To produce the soldered terminals 36, the contact ends 37, from which the insulation has been stripped, of the two individual wires 38 are laid in the same direction onto the contact lugs 30 located on the support bases 47 and are soldered by machine; the walls of the pockets 46 keep the contact ends 37 in position, and the support bases 47 absorb the pressure. The two individual wires 38, initially extended, are then bent back by virtually 180°, matching the contact ends 37, at the radially outer peripheral limitation of the pockets 46, so that these wires now cross the inner insulating shaped part 42 parallel in the axial direction of the injection nozzle.

For fixation of the individual wires 38, the inner insulating shaped body 42 has two retaining protrusions 51, 52, protruding transversely past the top of the plate in the extension of the pockets 46 and together with lateral ribs 54 defining an opening 55, through which a welding tool can be introduced, in order to form a deformation 56 in the bottom of the recess 34 in order to positionally fix the core 28 of the induction coil 24 after the adjustment thereof.

The two soldered terminals 36 and the individual wires 38 adjoining them and bent back over them are covered by the outer insulating shaped part 44, which is likewise inserted like a stopper into the recess 34, in a manner coinciding with the inner insulating shaped part 42. On its side toward the inner insulating shaped part 42, the outer insulating shaped part, coinciding with the individual wires 38, has an elongated recess 60 for receiving the individual wires 38, and in the recess it has a radially extending, protruding partition rib 61 for the partitioning and positional fixation of the wires. A retaining protrusion 62 also extends through the recess 60, transversely to its length and coinciding with the opening 55 in the inner insulating shaped part 42. When the outer insulating shaped part 44 is pressed into the recess 34 of the holder body 10, the individual wires 38 are received in the recess 60, divided by the partitioning rib 61, and the parts 63 of the individual wires 38 resting above the opening 55 and retaining protrusions 51, 52 of the inner insulating shaped part 42 are bent in a U around the retaining protrusion 62 of the outer insulating shaped part 44 and tensed, so that the soldered terminals 36 and the portion of the individual wires 38 adjoining them are relieved of tensile strain and received in a protected manner in both insulating shaped parts 42, 44. Additionally, the recess of the outer insulating shaped part 44 and the pockets 46 of the inner insulating shaped part 42 are filled with a silicone composition, which is injected through bores 64 in the outer insulating shaped part 44. The thus-encapsulated individual wires 38 are stripped of the sheath 39 of the sheathed cable 40 up to where they emerge from the insulating shaped part 42, 44, so that they can be shaped into a U with the retaining protrusions 51, 52 and 62 with relatively little force being exerted. Outside the insulating shaped parts 42, 44, the sheathed cable 40 rests in a longitudinal groove 67 in the holder body 10 that extends from the recess 34 to the connection end of the holder body 10, parallel to the longitudinal axis of the holder body. An elastic bush 68 having a collar 69 is slipped onto the sheathed cable 40, on the part immediately adjacent the recess 34. The insulating shaped parts 42, 44 and the sheathed cable 40 are fixed in their position with a cover strip 70. This cover strip 70 is seated in a wider and a more shallow longitudinal groove 71 above the longitudinal groove 67 and is held firm by being wedged at various points 72 at the edges of the longitudinal groove 71. The cover strip 70 extends from the collar 69 of the bush 68 over a groove 73 in the outer insulating shaped part 44, past this latter shaped part. The bush 68, held under pressure, and the collar 69 firmly hold the sheathed cable 40 in a sealed manner.

Figure 6:
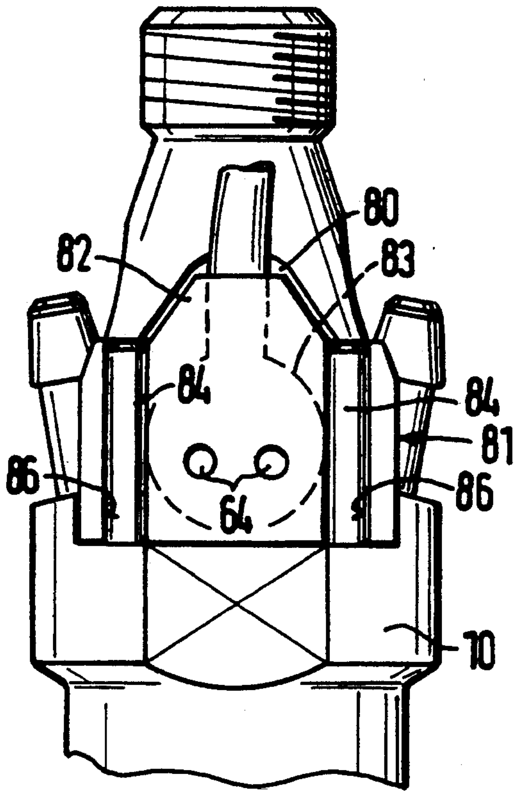
FIG. 6 shows a second exemplary embodiment of an electrical terminal of an injection nozzle, in a side view.
Figure 7:
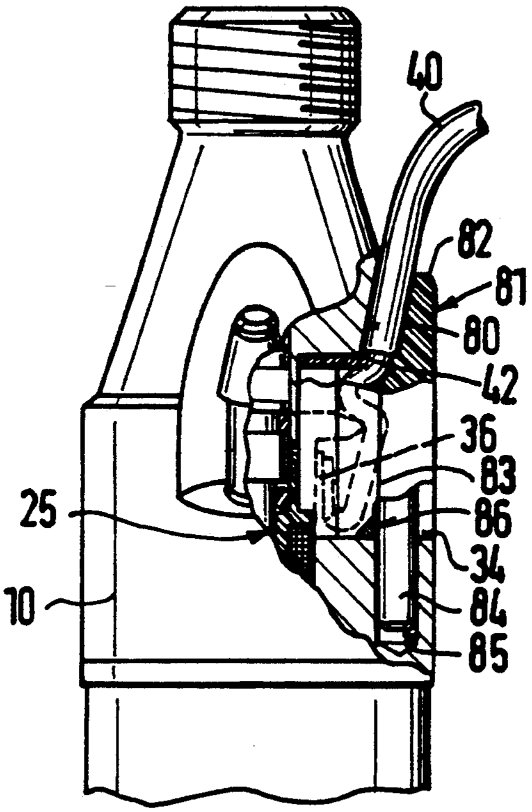
FIG. 7 shows the terminal of FIG. 6, partly in section.

In the exemplary embodiments of FIGS. 6 and 7, the disposition and embodiment of the soldered terminals and the fixation of the individual wires 38 of the sheath cable 40 are the same as in the first exemplary embodiment described above, but contrarily it differs substantially in the fastening of the outer insulating shaped part 81. This insulating shaped part 81 has not only a cylindrical extension 83, which engages the recess 34 of the holder body 10, but also an outer cap part 82, which is disposed in a vaulted recess 80 above the recess 34. The stopper-like extension 82 is embodied on the inside identically to the outer insulating shaped part 44 of the first exemplary embodiment. The cap part 82 of the insulating shaped part 81 that protrudes past the extension 83 is seated in a recess 80 above the recess 34 in the holder body 10, and it is fastened to the holder body 10 with two axially parallel pins 84, 85, which are seated in blind bores 86 of the holder body 10 and penetrate longitudinal grooves in the cap part 82.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection nozzle for internal combustion engines, having a holder body (10) to which a nozzle body (14), displaceably supporting a valve needle (12), is fastened and which includes a chamber (20) for receiving at least one closing spring (22) and an electrical needle motion sensor (25), which is influenced by a part (26) moved with the valve needle and has two radially protruding contact lugs (30) that protrude into a space (32) and into a lateral recess (34) in the holder body and said contact lugs are soldered to contact ends of onwardly extending insulated lines of sheathed cable (40) to form a soldered terminal, and also having an inner insulating shaped part (42), disposed in the lateral recess (34) of the holder body and resting on an edge of the lateral recess, said inner insulating shaped part is held in a prescribed position by an outer insulating shaped part (44) that shields the soldered terminal from the outside, in which said inner and outer insulating shaped parts are secured, said outer insulating shaped part is provided with at least one retaining protrusion on the holder body for tensile strain relief of the soldered terminals;

the inner insulating shaped part (42) rests on a bottom of the recess (34) which forms a support base (47), on which the contact lugs (30) rest, said contact lugs protrude through openings (49) in said support base, and are bent over, and above the support base, contact ends (37) of the sheathed cable, which include onwardly extending insulated lines, are electrically contacted to the contact lugs;

the inner insulating shaped part (42), adjoining the support region of the contact lugs (30), has at least one retaining protrusion (51, 52) protruding toward the outer insulating shaped part (44);

the at least one retaining protrusion (62) on the outer insulating shaped part (44) is disposed staggered with respect to the retaining protrusion (51, 52) of the inner insulating shaped part (42); and the onwardly extending insulating lines (38) adjoining the soldered terminals (36) of the contact lugs (30) and the contact ends (37) are bent back in a U, and bent around the at least one retaining protrusion (62) of the outer insulating shaped part (44), and supported by the retaining protrusions (51, 52) of the inner insulating shaped part (42).

2. An injection nozzle as defined by claim 1, in which the support base (47) of the inner insulating shaped part (42) is formed in pockets (46), which are separated from one another by a partition (48) and in which the contact lugs (30) and the contact ends (37) are disposed.

3. An injection nozzle as defined by claim 2, in which the holder body (10) adjoining the recess (34) has a longitudinal groove (67) in which the sheathed cable (40) emerges from the insulating shaped parts (42, 44), and the longitudinal groove (67) and the recess (34) along with the insulating shaped parts (42, 44) are at least partly covered by a cover strip (70) spanning the recess, which cover strip fixes the sheathed cable (40) and the insulating shaped parts under pressure.

4. An injection nozzle as defined by claim 3, in which the cover strip (70) is disposed in a groove (71) of the holder body (10) and is fixed by wedging deformations on the cover strip (70).

5. An injection nozzle as defined by claim 2, in which a cap part (82) is formed onto a cylindrical part (83) of an outer insulating shaped part (81), which covers a recess (80) above the recess (34) and is fixed with two pins (84).

6. An injection nozzle as defined by claim 2, in which the inner insulating shaped part (42) adjoining the support region of the soldered terminals (36) and the bent-back regions of the onwardly extending insulating lines (38), has an opening (55) that is defined by two protruding retaining protrusions (51, 52) and which is engaged by the retaining protrusion (62) on the outer insulating shaped part (44), fixing the onwardly extending lines in a U.

7. An injection nozzle as defined by claim 2, in which the outer insulating shaped part (44), on a side oriented toward the inner insulating shaped part (42), has a substantially coinciding recess (60) in mirror symmetry with the pockets (46), in which recess the bent-back parts of the onwardly extending lines (38) adjoining the contact ends (37) are disposed.

8. An injection nozzle as defined by claim 7, in which the holder body (10) adjoining the recess (34) has a longitudinal groove (67) in which the sheathed cable (40) emerges from the insulating shaped parts (42, 44), and the longitudinal groove (67) and the recess (34) along with the insulating shaped parts (42, 44) are at least partly covered by a cover strip (70) spanning the recess, which cover strip fixes the sheathed cable (40) and the insulating shaped parts under pressure.

9. An injection nozzle as defined by claim 8, in which the cover strip (70) is disposed in a groove (71) of the holder body (10) and is fixed by wedging deformations on the cover strip (70).

10. An injection nozzle as defined by claim 7, in which a cap part (82) is formed onto a cylindrical part (83) of an outer insulating shaped part (81), which covers a recess (80) above the recess (34) and is fixed with two pins (84).

11. An injection nozzle as defined by claim 7, in which the inner insulating shaped part (42) adjoining the support region of the soldered terminals (36) and the bent-back regions of the onwardly extending insulating lines (38), has an opening (55) that is defined by two protruding retaining protrusions (51, 52) and which is engaged by the retaining protrusion (62) on the outer insulating shaped part (44), fixing the onwardly extending lines in a U.

12. An injection nozzle as defined by claim 7, in which the pockets (46) of the inner insulating shaped part (42) and the recess (60) of the outer insulating shaped part (44) are filed with silicone composition.

13. An injection nozzle as defined by claim 12, in which the holder body (10) adjoining the recess (34) has a longitudinal groove (67) in which the sheathed cable (40) emerges from the insulating shaped parts (42, 44), and the longitudinal groove (67) and the recess (34) along with the insulating shaped parts (42, 44) are at least partly covered by a cover strip (70) spanning the recess, which cover strip fixes the sheathed cable (40) and the insulating shaped parts under pressure.

14. An injection nozzle as defined by claim 13, in which the cover strip (70) is disposed in a groove (71) of the holder body (10) and is fixed by wedging deformations on the cover strip (70).

15. An injection nozzle as defined by claim 12, in which a cap part (82) is formed onto a cylindrical part (83) of an outer insulating shaped part (81), which covers a recess (80) above the recess (34) and is fixed with two pins (84).

16. An injection nozzle as defined by claim 1, in which the holder body (10) adjoining the recess (34) has a longitudinal groove (67) in which the sheathed cable (40) emerges from the insulating shaped parts (42, 44), and the longitudinal groove (67) and the recess (34) along with the insulating shaped parts (42, 44) are at least partly covered by a cover strip (70) spanning the recess, which cover strip fixes the sheathed cable (40) and the insulating shaped parts under pressure.

17. An injection nozzle as defined by claim 16, in which the cover strip (70) is disposed in a groove (71) of the holder body (10) and is fixed by wedging deformations on the cover strip (70).

18. An injection nozzle as defined by claim 17, in which the part of the sheathed cable (40) covered by the cover strip (70) is surrounded by an elastic bush (68).

19. An injection nozzle as defined by claim 1, in which a cap part (82) is formed onto a cylindrical part (83) of an outer insulating shaped part (81), which covers a recess (80) above the recess (34) and is fixed with two pins (84).

20. An injection nozzle as defined by claim 1, in which the inner insulating shaped part (42) adjoining the support region of the soldered terminals (36) and the bent-back regions of the onwardly extending insulating lines (38), has an opening (55) that is defined by two protruding retaining protrusions (51, 52) and which is engaged by the retaining protrusion (62) on the outer insulating shaped part (44), fixing the onwardly extending lines in a U.

* * * * *